United States Patent Office 3,518,774
Patented July 7, 1970

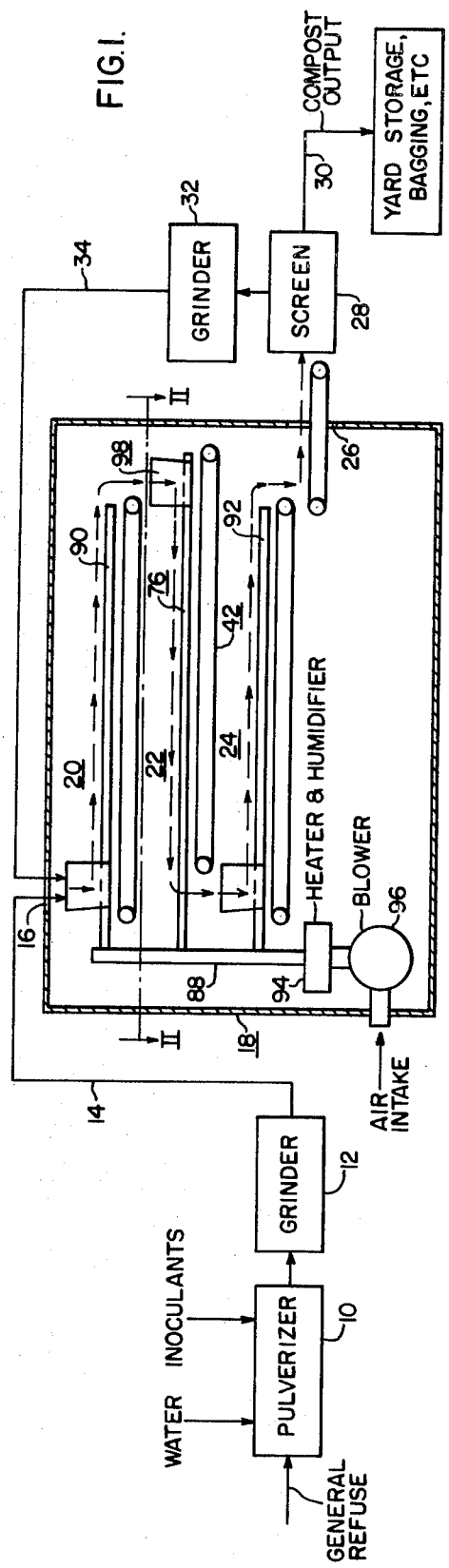
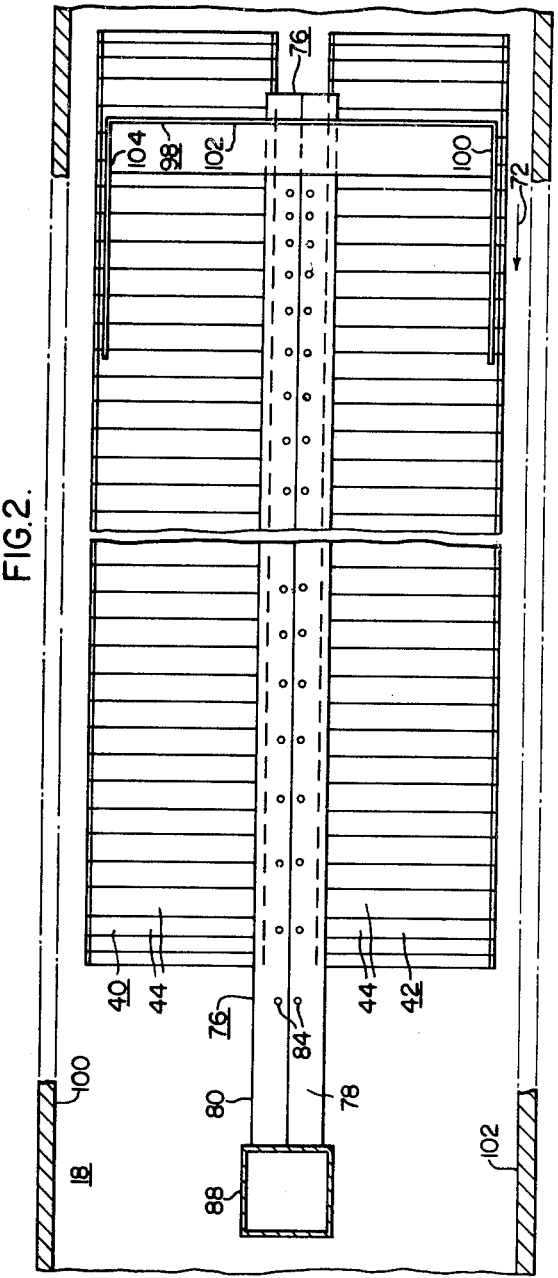

3,518,774
AERATING ARRANGEMENT AND METHOD FOR REFUSE DIGESTER
Leon G. Reimer, Buffalo, N.Y., assignor to Westinghouse Electric Corporation, Pittsburgh, Pa., a corporation of Pennsylvania
Filed Oct. 17, 1968, Ser. No. 768,457
Int. Cl. F26b 17/04
U.S. Cl. 34—33                                    11 Claims

ABSTRACT OF THE DISCLOSURE

There is described a refuse processing system having an aerobic digester arrangement wherein a plurality of parallel laterally spaced horizontal endless conveyors slowly carry comminute refuse material during the digestion process. Between each set of adjacent conveyors is a perforate duct extending lengthwise of the conveyors and having longitudinally spaced holes located above the conveyor plane. Means is provided for supplying forced air to the duct or ducts as the case may be. In normal operation the conveyors are charged or loaded with comminute refuse material to a level above the holes in the duct or ducts so that as the refuse material is moved along by the conveyors, the material is continuously aerated by the forced air in the duct or ducts escaping through the holes therein.

BACKGROUND OF THE INVENTION

This invention relates generally to reclamation of refuse such as city trash and garbage. One type of system utilizes aerobic fermentation at one stage of the reclamation process. In one example of such a system, after city refuse trucks dump their loads in a receiving area, large items such as bedsprings are removed and such easily segregated wood products as tree limbs and crates are shredded to facilitate handling and decomposition. A conveyor drops the refuse onto a picking belt, where a percentage of the incoming tonnage is removed for sale. Rags are picked off manually, while ferrous materials are removed magnetically.

The remaining material is thoroughly mixed and moistened in a pulverizer, after which it is further reduced in a grinder. Grinding hastens the subsequent decomposition by exposing more surfaces for bacterial action. The ground refuse material is then transferred to an aerobic digester, which may consist of a number of cells and slowly moving steel apron conveyors that move the refuse through each cell. After digestion the material may be reground and packaged or shipped in bulk as a byproduct such as soil compost.

The digester conditions provide a favorable environment for the types of bacteria and fungi that cause rapid, sanitary and odor-free breakdown of the refuse. These micro organisms also produce enough heat in their metabolic processes to kill all harmful organisms and weed seeds. An adequate supply of oxygen is necessary for promoting (inducing and maintaining) aerobic digestion. The digester cells are usually insulated to help retain and maintain digestion temperatures. The oxygen for the aerobic digestion is usually provided by aerating the ground material in one way or another with an aeration medium or gas that contains oxygen. Such an aeration gas may for example be air.

In one type of digester cell the comminute refuse material is carried by a slat-type conveyor with openings between slats for allowing air to percolate upward through the conveyor burden. In another somewhat similar type, a beaded pan type conveyor with a space between the overlapping beads allows to percolate upward through the conveyor burden. These prior approaches depend upon the ability of the air to percolate through the burden. This dependence has proved to be inadequate because of caking of the material between pans or slats.

SUMMARY OF THE INVENTION

In accordance with one embodiment of the invention an elongated perforate air duct is disposed lengthwise between adjacent horizontal laterally spaced conveyors, the duct having longitudinally spaced holes above the conveyor level so that comminute refuse material loaded on the conveyor to a level above the duct will cover the duct and will be continuously permeated with air forced through said duct and out the holes as the ground refuse material is carried along by the conveyors. The air duct is optimally shaped to provide a minimum of friction load.

It is therefore an object of the present invention to provide new and improved apparatus for supplying aerobic fermentation inducing gas to comminute refuse material in an aerobic digester cell.

Other and further objects and advantages of the invention will become apparent from the following description taken in connection with the drawings wherein a preferred embodiment of the invention is illustrated.

DESCRIPTION OF THE DRAWINGS

FIG. 1 is a block diagram of a refuse reclamation system employing an aerobic digester with an arrangement for aerating comminute refuse material in accordance with one embodiment of the invention;

FIG. 2 is a plan view of the middle digester cell in the digester of FIG. 1, and may be viewed as a section taken along line II—II of FIG. 1;

DESCRIPTION OF THE PREFERRED EMBODIMENTS

Figure 3:
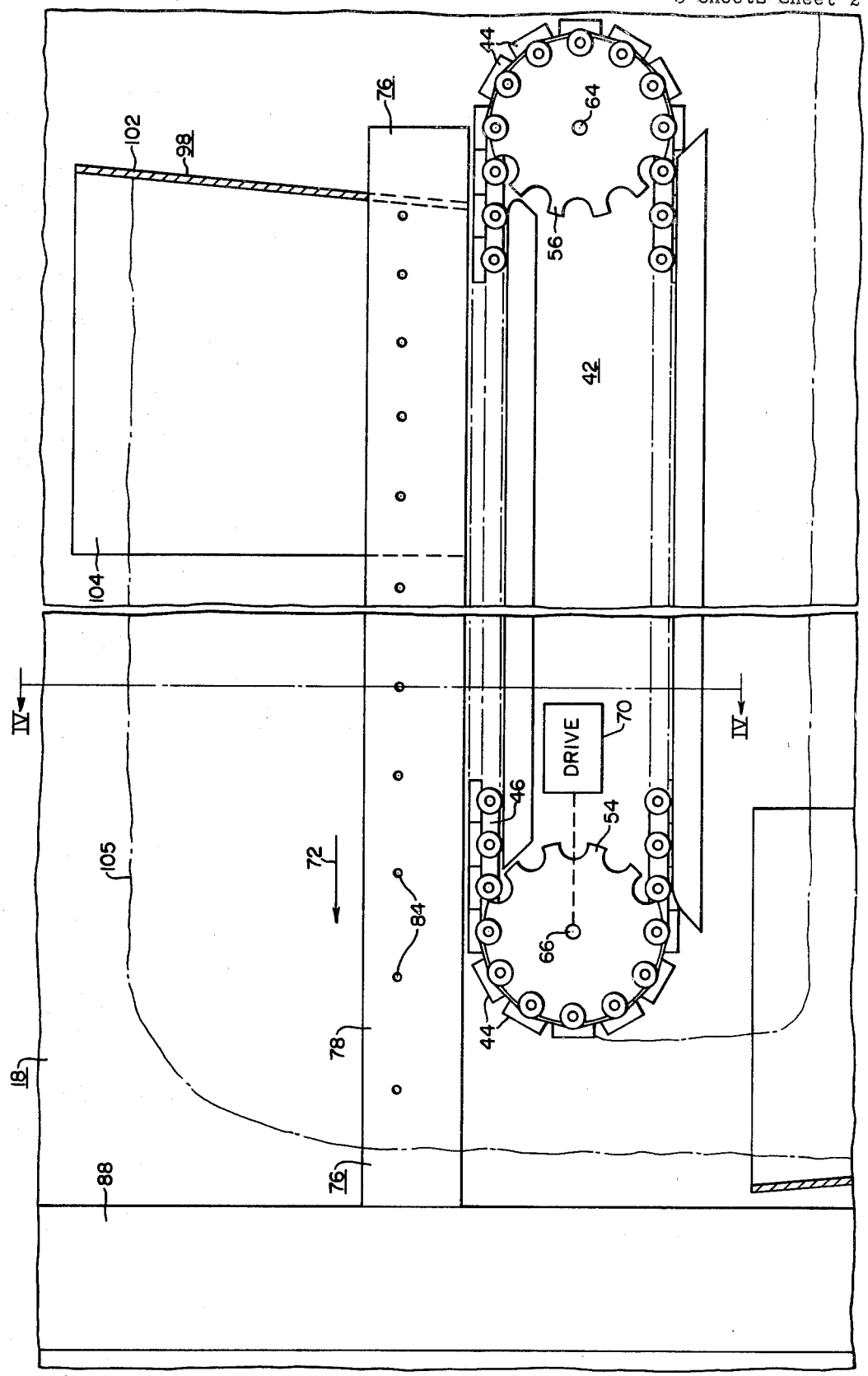
FIG. 3 is a front elevation of the middle cell of the digester with the front wall removed.

As seen in FIG. 1, general refuse is passed through a pulverizer 10 wherein water and, if desired, suitable inoculants such as thermophilic aerobic bacteria and fungi are mixed with the refuse. The pulverized and wetted refuse is further reduced by passing it through a grinder 12, from whence the ground refuse material is transferred along a line 14 for example by a suitable enclosed vertical conveyor or elevator to the inlet 16 at the of an aerobic digester 18. The particle size of the grinder output may for example be about .5 inch.

By way of example, digester 18 is shown as having three digester cells, an upper cell 20, a middle cell 22 and a lower cell 24. In the digester 18, the comminute refuse material is decomposed by aerobic digestion, a process which may take a number of days. The decomposed material leaves the digester 18 through an exit 26, and is passed through a screen 28. Particles of acceptable size pass through the screen and out along line 30 for either bulk storage or packaging as a compost for agricultural use. On the other hand, oversize particles are rejected by the screen 28 and are passed into a second grinder 32, and the reground refuse material is transferred along a line 34 to the inlet 16 of digester 18 for reprocessing.

The construction of cells 20, 22 and 24 is generally the same for each cell, and therefore only one cell (cell 22) will be described in detail. FIG. 2, which is substantially a section taken along line II—II of FIG. 1, is a plan view in greater detail of the middle digester cell 22, with structure below it deleted to avoid confusion.

Figure 4:
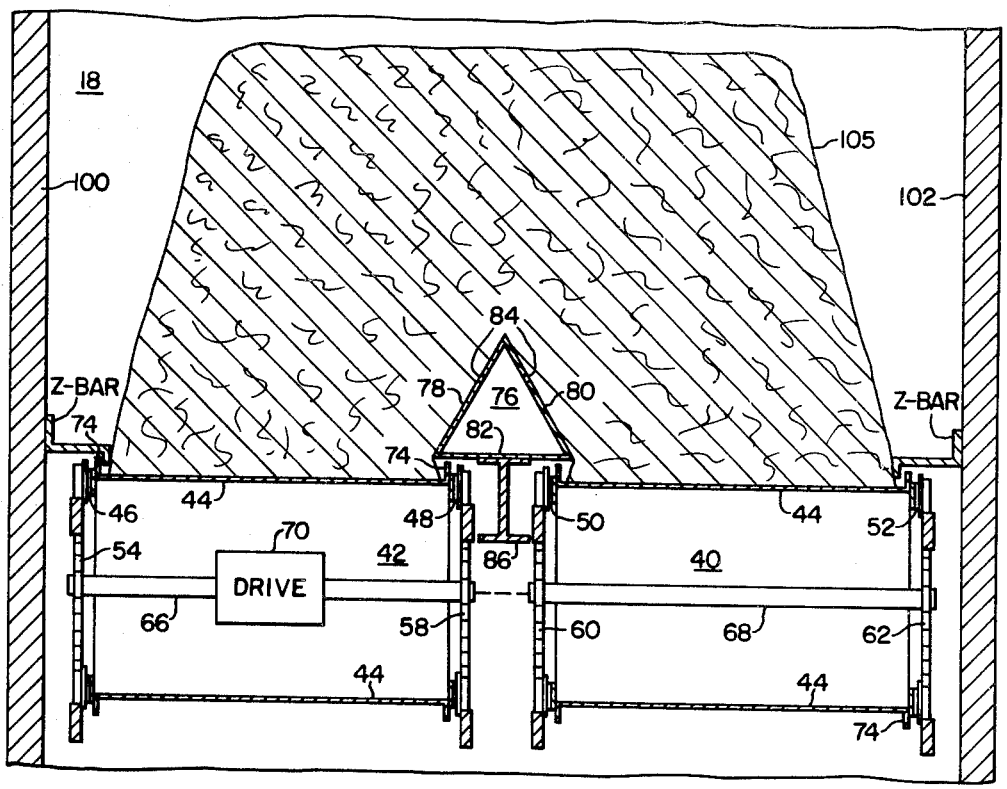
FIG. 4 is a section taken on the line IV—IV of FIG. 3.

As seen in FIGS. 2 and 4, cell 22 includes two parallel, laterally spaced, side-by-side, co-planar, horizontally disposed, continuous conveyors 40 and 42. By way of example, they are shown as pan conveyors which are made up of a plurality of overlapping plates or pans 44 secured to sprocket driven endless chains. In FIG. 3 only the "outside" chain 46 of conveyor 42 is visible, while in FIG. 4 the chains for both conveyors are seen in cross section. The chains for conveyor 42 are indicated at 46 and 48 while the chains for conveyor 40 are at 50 and 52. The two sprocket wheels around which chain 46 of conveyor 42 is looped are indicated at 54 and 56 in FIG. 3. In FIG. 4 the sprocket wheels for one end only of the conveyors are shown, it being understood that the chains for both conveyors are also looped around sprocket wheels at opposite ends of the conveyors. As seen in FIG. 4 chains 46 and 48 are wrapped around sprocket wheels 54 and 58 at one end of conveyor 42, while chains 50 and 52 are wrapped around sprocket wheels 60 and 62 at the corresponding end of conveyor 40.

The sprocket wheel 56 and its mate (unseen in drawings) on the opposite side of conveyor 42 are mounted on a shaft 64. At the other end of conveyor 42, sprocket wheels 54 and 58 are fixed to a shaft 66, while at the corresponding end of conveyor 40 sprocket wheels 60 and 62 are fixed to a shaft 68. Shafts 66 and 68 are synchronously driven by a drive system 70 to drive conveyors 40 and 42 at the same speed and provide conveyor travel (either intermittent or continuous) in the direction of arrow 72 (FIGS. 2 and 3) at a slow speed for example about 2.66 feet per minute. The movement may be continuous or incremental as by an indexing wheel in the drive system 70. It should be noted that the moving direction of the conveyors in cells 20 and 24 is opposite to that of the conveyors in cell 22 as is apparent from the dashed arrow line in FIG. 1 indicating the movement of the comminute refuse material through the digester 18.

The pans 44 have upturned ends 74 (for example 3 inches high) for restraining the base of the burden carried by the conveyors.

An elongate branch duct 76 for carrying aerobic digestion promoting gas, for example air, extends lengthwise of the conveyors and is disposed between the conveyors. By way of example, there is about ½ inch clearance between the bottom of the duct and pan ends 74. Duct 76 is shaped to provide low frictional resistance to movement of the conveyor burden, for example by forming the duct with a generally triangular cross section as illustrated (best seen in FIG. 4). The three sides of the triangular duct 78 are indicated at 78, 80 and 82. Each of the upwardly directed side walls 78 and 80 is provided with a plurality of longitudinally distributed holes 84. The holes 84 are preferably located in the upper half of each side wall (about ⅔ of the way up the wall from its base). The holes may for example be about 1 foot apart and range in size from ⅛ inch to ½ inch in diameter. In order to compensate for the pressure drop at the downstream end of the duct 76, the holes may be small at the upstream end of the distribution hole and progressively increase in size toward the downstream end. Thus the first hole at the upstream end may be a ⅛ inch hole, and the sizes of the holes progressively increase downstream to ½ inch at the downstream end of the duct. Alternatively, the holes may all be of the same size for example ⅛ inch while the distance between holes gets progressively smaller in the downstream direction along the line of holes. In either case, the net effect is to progressively increase, in the downstream direction, the "hole area" to compensate for the downstream pressure drop. To minimize the drag of the refuse material on the hole edges, the farther edge of each hole in the direction of material travel may be indented or dished to form an upwardly facing cavity.

The duct 76 is supported in any suitable manner for example by a beam 86 secured to the cell building structure. The downstream end of duct 76 is connected to a main duct 88, which as seen in FIG. 1 also feeds the branch ducts 90 and 92 for cells 20 and 24. Since the cells 20 and 24 are generally similar in structure to cell 22, ducts 90 and 92 are similar to duct 76. The main duct 88 is connected, for example through a heater and humidifier 94, to a motorized blower 96 whose air intake extends outside the digester building. The supply of air may be regulated by controlling the blower 96 and/or by controlling suitable valves and dampers (not shown) in the main and branch ducts. Stainless steel is a desirable material out of which the duct 76 may be formed.

As hereinbefore stated, the above-described conveyor arrangement for cell 22 is substantially the same as the conveyor arrangements for cells 20 and 24 except for direction of movement. As seen in FIG. 1, the flow of the comminute refuse material in cell 20 is from left to right so that the material discharges from the right end of the conveyor arrangement. The discharging material that falls from cell 20 falls downward through a preforming guide 98 onto the conveyor arrangement (conveyors 40 and 42) of cell 22. The area of conveyors 40 and 42 under the falling discharge from cell 20 may be referred to as the input point of the conveyor arrangement, the left ends of the conveyors 40 and 42 being the discharge point of the conveyor arrangement of this cell.

The preforming guide 98, as seen in FIGS. 2 and 3, is formed by three side walls 100, 102 and 104, suitably secured to the building structure of the digester 18. The side 102 slopes outwardly, at the top while the sides 96 and 100 slope slightly inward toward the top to preform or shape the piled refuse material to minimize material slides over the sides of the conveyor, and to minimize contact of the conveyor burden (refuse material) with the building walls 100 and 102 (FIG. 4) of the digester 18 in order to reduce frictional drag and to provide maximum exposure of the refuse material to the ambient atmosphere. It may be noted here that walls 102 and 104 are insulated to retain the processing heat in the digester.

During normal operation, the conveyor burden (refuse material in transit on the conveyor) extends from the feed point of the conveyor arrangement to the discharge end of the conveyor arrangement. Thus, the "burden zone" of the conveyor arrangement for any cell extends from the feed point to the discharge end of the conveyor arrangement. Also to prevent or to reduce the loss of material over the sides of the conveyor arrangement, a pair of Z-bars or rails ae attached to the walls 102 and 104 respectively and extend from the preforming guide 98 to the discharge end of the conveyor arrangement. In FIGS. 3 and 4, the outline of the conveyor burden is indicated by the wavy line 105.

By way of example, the following elements of the apparatus may have the indicated relations and dimensions:

|  | Feet |
|---|---|
| Conveyor length | 125 |
| Conveyor width | 5 |
| Sprocket wheel diameter | 3 |
| Branch duct 76 as viewed in cross section (FIG. 4)— each side of triangle 2 feet. | |

Air supply to duct 76—200 to 300 c.f.m. at 10 lbs./square inch above ambient atmospheric pressure.

It should be understood that in order to simplify the drawings, various structural adjuncts such as brackets, mountings, bearings, etc., for the illustrated apparatus are not shown.

In normal operation, the comminute refuse material enters the digester 18 at a rate of flow that is so related to the speed of the conveyors in the various cells of the digester 18 that the conveyor burden is piled to and maintains a level above the top of duct 76, for example about 6 feet above the conveyor level or plane (upper carrying surface of the conveyor).

With the refuse material piled on the conveyor to a depth extending over the top of the duct 76, the conveyor burden of the two conveyors forms a bridge over the top of the duct. This provides very efficient permeation of the conveyor burden with the forced air because the forced air is effective to permeate the material for more than a two foot radius around each air hole in the duct. To provide a more continuing and fuller exposure to forced aeration, the distribution of the holes 84 along duct 76 should extend substantially the entire length of the burden zone. This will provide any given moving increment of the refuse material with optimal exposure to the forced air.

Figure 5:
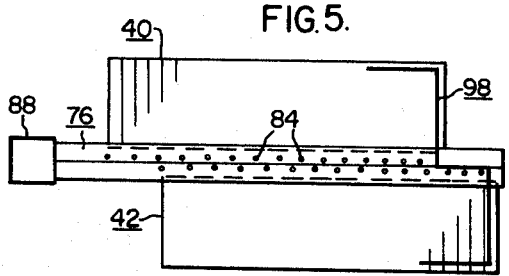
FIGS. 5 and 6 are respectively plan and elevation views of another embodiment of the invention wherein two parallel conveyors are staggered.
Figure 6:
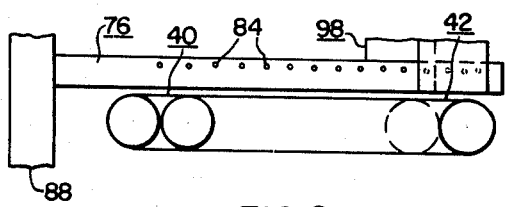

An alternative conveyor arrangement is shown in FIGS. 5 and 6 wherein the parallel, side-by-side conveyors 40 and 42 are in staggered relation within the horizontal plane in which they both lie. FIG. 5 is a plan view with a minimum of detail merely to illustrate the staggered relationship, while FIG. 6 is a front elevation of the arrangement in FIG. 5. It will be noted that in this alternative arangement, the conveyors 40 and 42 are contiguous to a common zone for a substantial length of both conveyors, i.e., they are coextensive for a common longitudinal distance. Also it will be noted that the preforming guide 98 has a guide wall pattern conforming to the staggered relationship of the conveyors, and that distribution of the holes on each side of the duct is coextensive with the burden zone of the conveyor on that side of the duct.

Figure 7:
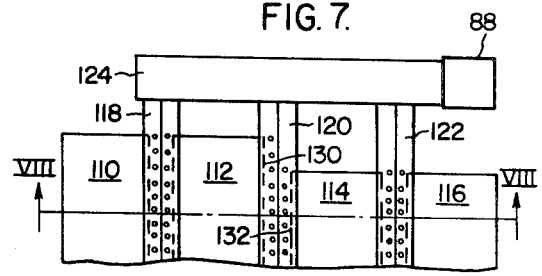
FIG. 7 is a plan view of another embodiment of the invention wherein a digester cell has four parallel laterally spaced conveyors with ducts between adjacent conveyors in accordance with the invention.
Figure 8:
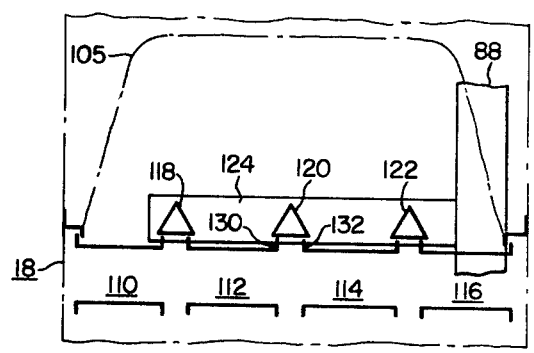
FIG. 8 is a section taken along the line VIII—VIII of FIG. 7.

In the embodiment of FIGS. 7 and 8, there are four parallel conveyors, 110, 112, 114 and 116, disposed side-by-side with a branch air duct between each set of two adjacent conveyors. More specifically, there is an air duct 118 between the set of adjacent conveyors 110 and 112; an air duct 120 between the set of adjacent conveyors 112 and 114; and an air duct 122 between the set of adjacent conveyors 114 and 116. The view of FIG. 7 is in plan and shows only one end of the conveyors. It may be noted that conveyors 110 and 112 are staggered relative to conveyors 114 and 116 within the common plane of the four conveyors. Ducts 118, 120 and 122 are connected to a manifold 124, which in turn is connected to a main air duct 88 and thence to the forced air supply. As seen in FIG. 8, in normal operation the conveyor burden (comminute refuse material) whose outline is indicated by the wavy line, extends commonly across the four conveyors and "bridges" over ducts 118, 120 and 122, to provide maximum aeration of the comminute material as it is carried along by the four conveyors operating in unison.

All the conveyors in each of FIGS. 5 and 7 are driven synchronously in unison (at same speed) to advance the refuse material by suitable drive systems (not shown).

It is to be understood that the structure and detail of the conveyors and air ducts of FIGS. 5 to 8 are generally similar to those of FIGS. 1 to 4.

It should be apparent that in each of FIGS. 4, 5 and 6, there are a plurality of parallel, side-by-side, laterally-spaced conveyors with an air duct between each set of two adjacent conveyors. Each branch air duct is disposed longitudinally of the adjacent to the adjacent sides of its associated set of adjacent conveyors. For example in FIG. 7, duct 120 lies lengthwise of and adjacent to the adjacent sides 130 and 132 of the set of adjacent conveyors 112 and 114.

Among the advantages and attributes of the present invention are the following: the air duct is arranged to provide a minimum of friction load; the holes in the duct will meter the desired amount of air into the refuse material. the arrangement provides flexibility to adjust air supply to fit needs of the degenerating refuse material. the arrangement described lends itself to a continuous process with varying degrees of input in that the air supply may be varied to suit input conditions; the arrangement described allows the use of preheated air, in that the duct, by virtue of being insulated by the material in process, will not act as a radiator and cool the air; also by virtue of such insulation, pre-moistened air may be used without condensation in the duct or excessive dehydration of the decomposing refuse; by essentially installing the air duct in the material in process, the required oxygen is delivered to the utilization point rather than presenting the oxygen into the vicinity of the material in process and depending upon other hopeful means of getting the oxygen into the material in process; and the particular embodiments employing multiple ducts allows for economical design of a digester which can handle large tonnages of material input and successfully digest the material input.

It is to be understood, that the herein described arrangements are simply illustrative of the principles of the invention, and that other embodiments and applications are within the spirit and scope of the invention.

I claim as my invention:

1. In an aerobic digester for comminute refuse material:
   (a) generally horizontal continuous conveyor means; and
   (b) duct means for carrying gas disposed lengthwise of said conveyor means, said duct means lying between and spaced inwardly from the opposite sides of the conveyor means, said duct means having defining wall means with surface means having longitudinally spaced holes disposed above the level of said conveyor means, whereby refuse material deposed on said conveyor means to a level above said holes will be continuously permeated with gas from said duct means as the refuse material is carried along by the conveyor means.

2. The combination as in claim 1 which further includes means for supplying aerobic digestion promoting gas under pressure to said duct means.

3. The combination of claim 2 wherein said gas is air.

4. The combination as in claim 1 wherein said duct means comprises a polygonal cross-section duct having a first side with a downwardly facing outer surface, and second and third sides which converge together at the top, said second and third sides each having longitudinally distributed holes located above the level of the conveyor means.

5. The combination as in claim 1 wherein said duct means comprises a generally triangular cross section duct having first, second and third sides, the first side having a downwardly facing outer surface, the second and third sides having upwardly facing outer surfaces, the second and third sides each having longitudinally spaced holes located above the level of the conveyor means.

6. The combination of claim 1 wherein the distribution of said holes extends substantially from the input area of the conveyor means to the output area of the conveyor means.

7. The combination of claim 1 wherein said duct means comprises a plurality of laterally spaced ducts each extending lengthwise of and adjacent to the conveyor means, each of said ducts having wall means provided with holes disposed above the level of said conveyor means said holes being spaced lengthwise of the duct.

8. The combination as in claim 1 wherein said conveyor means comprises at least two parallel laterally spaced endless conveyors, and said duct means comprises a duct associated with each set of two adjacent ones of said conveyors, the duct associated with each set of adjacent conveyors being disposed along and adjacent to the adjacent sides of the conveyors in the set, each duct having defining walls with surface means having holes located above the level of said conveyors in the associated set.

9. The method of aerating comminute refuse material with aerobic digestion promoting gas in aerobic digesting apparatus having horizontal continuous conveyor means, and duct means disposed lengthwise of the conveyor means and inward of the opposite sides of the conveyor means, said duct means having longitudinally spaced holes located above the level of the conveyor means, said method comprising the steps of supplying aerobic digestion promoting gas to said duct means under pressure, driving said conveyor means, feeding comminute refuse material to said conveyor means at a rate such that the level of the conveyed refuse material is above said duct means and forms a bridge across the top of the duct means which bridge is maintained as the conveyor burden is carried along by the conveyor means.

10. The combination as in claim 9 wherein said conveyor means comprises a plurality of parallel, side-by-side conveyors and said duct means comprises a duct lying lengthwise of and adjacent to the adjacent sides of each set of adjacent conveyors.

11. The method of operating aerobic digesting apparatus having horizontal, continuous conveyor means, and duct means disposed lengthwise of the conveyor means and inward of the opposite sides of the conveyor means, said duct means having longitudinally spaced holes located above the level of the conveyor means, said method comprising the steps of supplying aerobic digestion promoting gas to said duct means under pressure, driving said conveyor means, feeding comminute refuse material to said conveyor means at a rate such that the level of the conveyed refuse material is above said duct means and forms a bridge across the top of the duct means which bridge is maintained as the conveyor burden is carried along by the conveyor means.

References Cited

UNITED STATES PATENTS

| | | |
|---|---|---|
| 951,804 | 3/1910 | Ekelund. |
| 1,101,129 | 6/1914 | Kitchen. |
| 2,026,969 | 1/1936 | Flynn _____ 110—15 |
| 2,067,115 | 1/1937 | Bogaty _____ 34—33 XR |
| 3,293,768 | 12/1966 | Blank et al. _____ 34—33 XR |

DONLEY J. STOCKING, Primary Examiner

R. A. DUA, Assistant Examiner

U.S. Cl. X.R.

34—203; 110—15

UNITED STATES PATENT OFFICE
CERTIFICATE OF CORRECTION

Patent No. 3,518,774            Dated July 7, 1970

Inventor(s) L. G. Reimer

It is certified that error appears in the above-identified patent and that said Letters Patent are hereby corrected as shown below:

Column 6, lines 35 and 36, "deposed" should be -- deposited --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents